(12) United States Patent
Pollefeys

(10) Patent No.: US 11,190,904 B2
(45) Date of Patent: *Nov. 30, 2021

(54) RELATIVE SPATIAL LOCALIZATION OF MOBILE DEVICES

(71) Applicant: Microsoft Technology Licensing, LLC, Redmond, WA (US)

(72) Inventor: Marc Andre Leon Pollefeys, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/773,780

(22) Filed: Jan. 27, 2020

(65) Prior Publication Data

US 2020/0304942 A1    Sep. 24, 2020

Related U.S. Application Data

(63) Continuation of application No. 16/357,582, filed on Mar. 19, 2019, now Pat. No. 10,547,974.

(51) Int. Cl.
*H04W 24/00* (2009.01)
*H04W 4/02* (2018.01)
*H04W 64/00* (2009.01)

(52) U.S. Cl.
CPC ........... *H04W 4/023* (2013.01); *H04W 4/026* (2013.01); *H04W 64/003* (2013.01)

(58) Field of Classification Search
USPC ............................ 348/46; 382/209; 715/704
See application file for complete search history.

(56) References Cited

U.S. PATENT DOCUMENTS

| 9,390,561 | B2 * | 7/2016 | Brown | H04N 1/00347 |
| 9,736,368 | B2 * | 8/2017 | Lablans | G06T 7/246 |
| 10,571,925 | B1 * | 2/2020 | Zhang | G05D 1/0246 |
| 10,796,487 | B2 * | 10/2020 | Crews | G06F 3/011 |

(Continued)

FOREIGN PATENT DOCUMENTS

EP    3094080 A1 *    11/2016    ........... G06T 19/006

OTHER PUBLICATIONS

"International Search Report and Written Opinion Issued in PCT Application No. PCT/US20/015753", dated Jul. 24, 2020, 10 Pages.

*Primary Examiner* — David Q Nguyen
(74) *Attorney, Agent, or Firm* — Ray Quinney & Nebeker, P.C.; Thomas M. Hardman; Phong T. Dinh

(57) ABSTRACT

To obtain a relative localization between a plurality of mobile devices, a first mobile device observes a second mobile device within a field of view of the first mobile device's camera at time t1, determines a first position of the first mobile device at t1, and receives from the second mobile device a second position of the second mobile device at t1. The first mobile device determines information about the first mobile device's orientation with respect to the second mobile device at t1 based at least in part on the first position and the observation of the second mobile device. The first mobile device identifies two constraints that relate the mobile devices' coordinate systems based at least in part on the second position and the orientation information. The first mobile device's pose relative to the second mobile device may be calculated once at least six constraints are accumulated.

20 Claims, 5 Drawing Sheets

(56) References Cited

U.S. PATENT DOCUMENTS

| | | | |
|---|---|---|---|
| 2012/0062702 A1* | 3/2012 | Jiang | G06T 19/006 348/46 |
| 2012/0062758 A1 | 3/2012 | Devine et al. | |
| 2014/0267234 A1 | 9/2014 | Hook et al. | |
| 2015/0193982 A1 | 7/2015 | Mihelich et al. | |
| 2015/0346932 A1* | 12/2015 | Nuthulapati | G06F 3/167 715/704 |
| 2016/0012593 A1* | 1/2016 | Chao | G06T 7/337 382/209 |
| 2018/0286072 A1* | 10/2018 | Tsai | G01C 21/20 |
| 2019/0087662 A1* | 3/2019 | Zhao | H04N 7/188 |
| 2019/0156121 A1* | 5/2019 | Kucharski | G01C 21/20 |

\* cited by examiner

RELATIVE SPATIAL LOCALIZATION OF MOBILE DEVICES

CROSS-REFERENCE TO RELATED APPLICATIONS

This application is related to and claims the benefit of U.S. patent application Ser. No. 16/357,582 filed on Mar. 19, 2019. The aforementioned application is expressly incorporated herein by reference in its entirety.

BACKGROUND

Mixed reality, which can also be known as augmented reality, involves the merging of real-world objects and/or people with virtual objects to produce new environments and visualizations where physical and digital objects co-exist and interact in real time. Mixed-reality devices augment a user's view of the real world with virtual objects that aim to look as if they are actually placed within the real world. A mixed-reality device may allow the user to view their real-world surroundings through a semi-transparent display. Virtual objects can then be presented on the display. These virtual objects appear to be superimposed on the user's view of their real-world surroundings, thereby merging virtual reality with physical reality.

A mixed-reality experience can be shared among multiple mixed-reality devices. This enables multiple users to have common shared experiences within a shared mixed-reality environment. There are many different scenarios where a shared mixed-reality experience could be useful and/or enjoyable, such as a game where players are able to interact with one another and with virtual objects as part of the game.

To facilitate shared mixed-reality experiences, it is important for multiple devices to be able to compute their position and motion in the same coordinate system so that they can be aware of each other's relative position. Most mixed-reality devices are able to determine their own relative motion, but not necessarily their relative pose (i.e., position and orientation) with respect to other devices.

The typical solution to register the coordinate system for multiple devices is to exchange three-dimensional map information (or two-dimensional image data) between devices so that the relative pose between these maps/images can be determined. These solutions can either be implemented peer-to-peer or over a cloud service.

The exchange of map data, however, can be cumbersome and present privacy risks. Moreover, when users' viewpoints differ significantly from each other the traditional image feature matching can fail, resulting in the inability of devices to determine a joint coordinate system and thus to share a mixed-reality experience. This may happen, for example, in scenarios where users look at each other and the camera and therefore view opposite sides of the same space, which is often the natural configuration for games and other types of shared mixed-reality experiences.

SUMMARY

In accordance with one aspect of the present disclosure, a method implemented by a first mobile device is disclosed. The method includes detecting a second mobile device within a field of view of a camera of the first mobile device at a plurality of different points in time. The method further includes determining first position information based on the detecting. The first position information indicates a position of the first mobile device and a position of the second mobile device at the plurality of different points in time in a first coordinate system used by the first mobile device. The method further includes obtaining second position information indicating the position of the second mobile device at the plurality of different points in time in a second coordinate system used by the second mobile device. The method further includes calculating a pose of the first mobile device relative to the second mobile device based at least in part on the first position information and the second position information.

The pose may be calculated without the first mobile device and the second mobile device exchanging three-dimensional map information.

The method may further include receiving user input when the second mobile device is observed within the field of view of the camera of the first mobile device at a first point in time. The method may further include determining, in response to the user input, the position of the first mobile device and the position of the second mobile device in the first coordinate system at the first point in time. The method may further include obtaining, in response to the user input, the position of the second mobile device in the second coordinate system at the first point in time.

The method may be performed during a game that involves the first mobile device and the second mobile device. The user input may be provided as part of the game.

Calculating the pose may include calculating a six degrees of freedom transformation that relates the first coordinate system used by the first mobile device to the second coordinate system used by the second mobile device.

Calculating the pose may include determining orientation information indicating an orientation of the first mobile device with respect to the second mobile device at the plurality of different points in time based at least in part on the first position information. Calculating the pose may also include identifying at least six constraints that relate the first coordinate system used by the first mobile device to the second coordinate system used by the second mobile device based at least in part on the orientation information.

Determining the orientation information for a first point in time may include determining a geometric line in space corresponding to a direction along which the second mobile device was observed at the first point in time. Calculating the pose may further include using the orientation for the first point in time to identify two constraints that relate the first coordinate system to the second coordinate system.

Detecting the second mobile device may include detecting an activated light emitter of the second mobile device.

The second mobile device and at least one additional mobile device may be both visible within the field of view of the camera of the first mobile device during at least one of the plurality of different points in time. The method may further include distinguishing between the second mobile device and the at least one additional mobile device.

The method may further include creating a first simultaneous localization and mapping (SLAM) map based on the field of view of the camera of the first mobile device and merging the first SLAM map with a second SLAM map that is created by the second mobile device.

In accordance with another aspect of the present disclosure, a first mobile device is disclosed. The first mobile device includes a camera configured to observe a second mobile device within a field of view of the camera at a plurality of different points in time, one or more processors, memory in electronic communication with the one or more processors, and instructions stored in the memory. The instructions are executable by the one or more processors to calculate a pose of the first mobile device relative to the second mobile device based at least in part on observations of the second mobile device made by the camera and position information obtained from the second mobile device. The position information indicates a position of the second mobile device at the plurality of different points in time in a coordinate system used by the second mobile device.

The first mobile device may further include a user input device and additional instructions stored in the memory. The additional instructions may be executable by the one or more processors to receive user input when the second mobile device is observed within the field of view of the camera of the first mobile device at a first point in time. The additional instructions may also be executable by the one or more processors to determine, in response to the user input, a position of the first mobile device and the position of the second mobile device in a coordinate system used by the first mobile device at the first point in time. The additional instructions may also be executable by the one or more processors to obtain, in response to the user input, the position of the second mobile device in the coordinate system used by the second mobile device at the first point in time.

The instructions executable to calculate the pose may include instructions executable to calculate a six degrees of freedom transformation that relates a coordinate system used by the first mobile device to the coordinate system used by the second mobile device.

The first mobile device may further include additional instructions stored in the memory. The additional instructions may be executable by the one or more processors to determine orientation information indicating an orientation of the first mobile device with respect to the second mobile device at the plurality of different points in time based at least in part on the observations of the second mobile device made by the camera. The additional instructions may be executable by the one or more processors to identify constraints that relate a coordinate system used by the first mobile device to the coordinate system used by the second mobile device based at least in part on the orientation information.

The second mobile device and at least one additional mobile device may be both visible within the field of view of the camera of the first mobile device during at least one of the plurality of different points in time. The first mobile device may further include additional instructions stored in the memory. The additional instructions may be executable by the one or more processors to distinguish between the second mobile device and the at least one additional mobile device.

The first mobile device may further include additional instructions stored in the memory. The additional instructions may be executable by the one or more processors to create a first simultaneous localization and mapping (SLAM) map based on the field of view of the camera of the first mobile device. The additional instructions may also be executable by the one or more processors to merge the first SLAM map with a second SLAM map that is created by the second mobile device.

In accordance with another aspect of the present disclosure, a computer-readable medium is disclosed. The computer-readable medium includes instructions that are executable by one or more processors to obtain first position information based on observations by a first mobile device of a second mobile device at a plurality of different points in time. The first position information indicates a position of the first mobile device and a position of the second mobile device at the plurality of different points in time in a first coordinate system used by the first mobile device. The computer-readable medium also includes instructions that are executable by one or more processors to obtain second position information indicating a position of the second mobile device at the plurality of different points in time in a second coordinate system used by the second mobile device. The computer-readable medium also includes instructions that are executable by one or more processors to calculate a pose of the first mobile device relative to the second mobile device based at least in part on the first position information and the second position information. The pose is calculated without the first mobile device and the second mobile device exchanging three-dimensional map information.

The instructions executable to calculate the pose may include instructions executable to calculate a six degrees of freedom transformation that relates the first coordinate system used by the first mobile device to the second coordinate system used by the second mobile device.

The computer-readable medium may further include additional instructions stored in memory. The additional instructions may be executable by the one or more processors to determine orientation information indicating an orientation of the first mobile device with respect to the second mobile device at the plurality of different points in time based at least in part on the first position information. The additional instructions may also be executable by the one or more processors to identify constraints that relate the first coordinate system used by the first mobile device to the second coordinate system used by the second mobile device based at least in part on the orientation information.

The computer-readable medium may further include additional instructions stored in memory. The additional instructions may be executable by the one or more processors to create a first simultaneous localization and mapping (SLAM) map based on a field of view of a camera of the first mobile device and merge the first SLAM map with a second SLAM map that is created by the second mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1A:
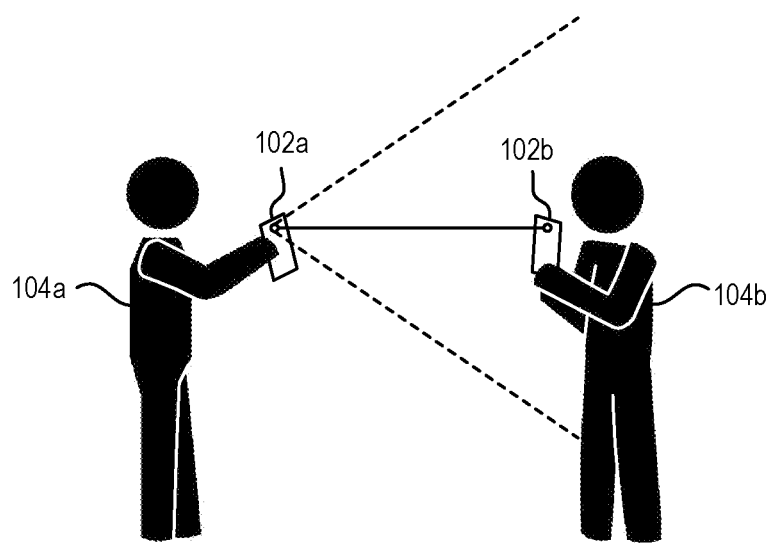
FIGS. 1A-C illustrate an example of a method for obtaining a relative localization between a plurality of mobile devices.

The present disclosure is generally related to obtaining a relative localization between a plurality of mobile devices, each of which includes a camera and is able to keep track of its own position and motion in space using its own coordinate system. The techniques disclosed herein are applicable to any scenario in which it is desirable for a plurality of mobile devices to compute their position and motion in the same coordinate system so that they can be aware of each other's relative position. As one example, the techniques disclosed herein may be utilized in the context of shared mixed-reality experiences.

As used herein, the term "mobile device" refers to a portable computing device that includes a camera and is capable of implementing the spatial localization techniques disclosed herein. In some embodiments, a mobile device may be small enough for a user to hold and operate the mobile device in the user's hand. In some embodiments, a mobile device may be a wearable computing device. In some embodiments, a mobile device may be a mixed reality (or augmented reality) device that is capable of providing a mixed reality (or augmented reality) experience for users. Some examples of mobile devices include head-mounted displays, smartglasses, smartphones, tablet computers, and laptop computers. Mobile devices may be capable of connecting to one or more computer networks, such as the Internet. Mobile devices may also be capable of establishing peer-to-peer communication with other computing devices.

The techniques disclosed herein utilize direct observations of a mobile device within the field of view of another mobile device's camera. Consider a simple example involving two mobile devices, a first mobile device and a second mobile device. Suppose that the first mobile device observes the second mobile device within the field of view of the first mobile device's camera. When this occurs, the first mobile device is able to use its own position and its observation of the second mobile device to constrain the orientation of the first mobile device with respect to the second mobile device. In other words, the first mobile device is able to determine information about the orientation of the first mobile device with respect to the second mobile device. This orientation information, along with the position of the second mobile device (as represented in the coordinate system used by the second mobile device), may be used to identify two constraints for relating the coordinate system used by the first mobile device to the coordinate system used by the second mobile device.

Once at least six constraints have been accumulated, the pose of the first mobile device relative to the second mobile device (and vice versa) may be calculated. More specifically, the six (or more) constraints may be used to calculate the six degrees of freedom (6 DoF) transformation that relates the first coordinate system used by the first mobile device to the second coordinate system used by the second mobile device.

As used herein, the term "observation event" refers to a situation in which one mobile device observes another mobile device within its camera's field of view, and the corresponding position information and orientation information is used to determine two constraints that relate the two mobile devices' coordinate systems. As will be discussed in greater detail below, in some embodiments an observation event may be triggered by user input. Alternatively, an observation event may be triggered when one mobile device automatically detects another mobile device in its camera's field of view.

The disclosed techniques for obtaining the relative localization between a plurality of mobile devices may be particularly advantageous in situations where it is not possible or desirable for the plurality of mobile devices to share a three-dimensional (3D) environment map with one another. This may occur, for example, when users' viewpoints differ significantly from each other.

In some embodiments, the disclosed techniques may reduce processing requirements relative to known approaches. As indicated above, the typical solution to register the coordinate system for a plurality of mobile devices is to exchange three-dimensional (3D) map information between the mobile devices. The techniques disclosed herein, however, enable the relative localization between a plurality of mobile devices to be obtained without exchanging 3D map information. This may reduce the amount of processing that is required to align the coordinate systems of a plurality of mobile devices. For example, mobile devices that align their coordinate systems in accordance with the techniques disclosed herein do not have to determine or exchange 3D map information. Therefore, the amount of processing that is required to determine and/or exchange 3D map information may be saved by utilizing the techniques disclosed herein.

The ability to obtain the relative localization between a plurality of mobile devices without exchanging 3D map information may also reduce the amount of map information needs to be stored, and consequently reduce storage requirements for mobile devices. In addition to reducing storage requirements, the techniques disclosed herein may also reduce the amount of information that is communicated between a plurality of mobile devices (either via computer network(s) or via peer-to-peer communications). Instead of exchanging 3D map information, which can be quite data intensive, the mobile devices may simply exchange some position information and some orientation information associated with specific points in time (as will be discussed in greater detail below). This potentially reduces the amount of information that is communicated between the plurality of mobile devices, thereby potentially freeing a significant amount of communication bandwidth for other purposes.

Notwithstanding the foregoing, however, three-dimensional map information may still be exchanged under some circumstances in accordance with the techniques disclosed herein. As will be discussed in greater detail below, in some embodiments, the 3D maps that are being constructed by each mobile device can be merged into a larger, more complete map.

An example of a method for obtaining a relative localization between a plurality of mobile devices will be described in relation to FIGS. 1A-C. This example involves two mobile devices 102a-b, a first mobile device 102a and a second mobile device 102b. The coordinate system used by the first mobile device 102a will be referred to herein as a first coordinate system, and the coordinate system used by the second mobile device 102b will be referred to herein as a second coordinate system. The user of the first mobile device 102a will be referred to as the first user 104a, and the user of the second mobile device 102b will be referred to as the second user 104b.

FIG. 1A illustrates the first user 104a aiming the first mobile device 102a at the second user 104b, and the second user 104b aiming the second mobile device 102b at the first user 104a. This may occur, for example, during a game in which the users are supposed to shoot at each other using the mobile devices. FIG. 1B illustrates the field of view of the camera of the first mobile device 102a when the first mobile device 102a is aimed at the second mobile device 102b (as shown in FIG. 1A), as it may be displayed to the first user 104a on a display 106 of the first mobile device 102a. FIG. 1C illustrates the trajectory 108a of the first mobile device 102a and the trajectory 108b of the second mobile device 102b as the first user 104a and the second user 104b move around over a period of time (e.g., while moving around during a game).

Figure 1B:
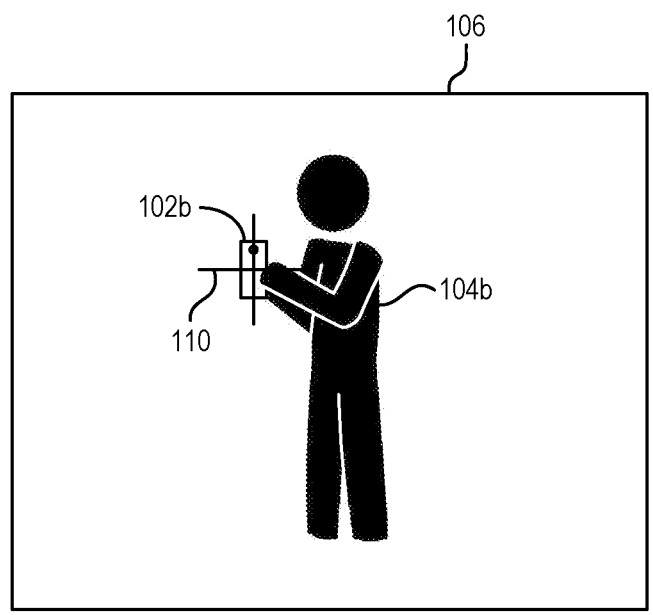
Figure 1C:
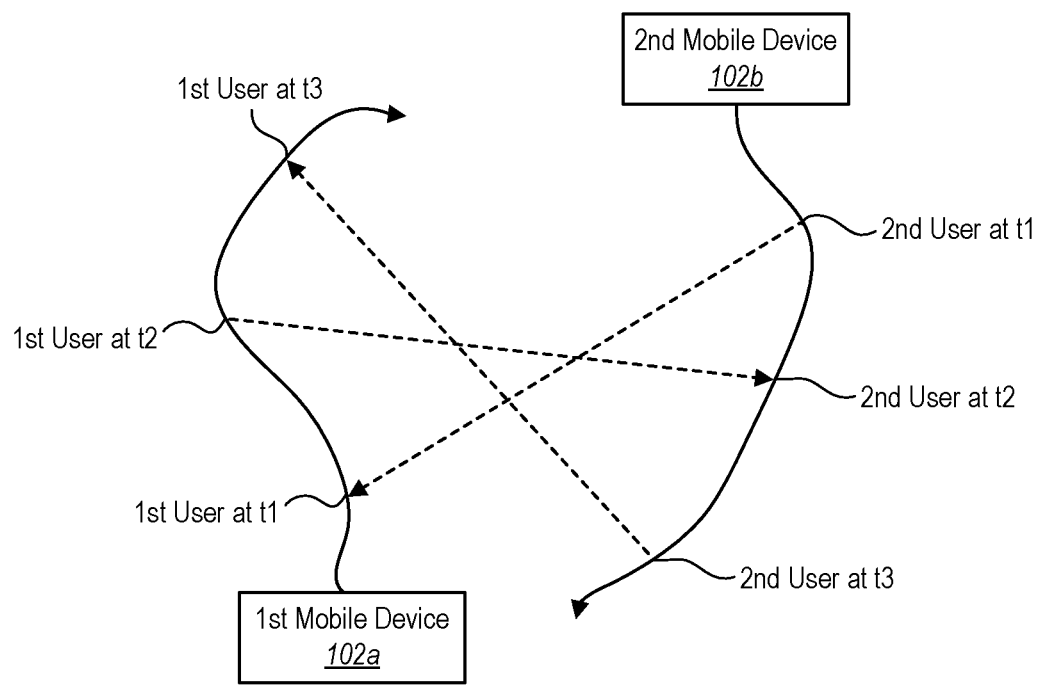

As shown in FIG. 1C, at time t1 the first user 104a positions the first mobile device 102a so that the second mobile device 102b is located within the field of view of the camera of the first mobile device 102a (and is therefore visible on the display 106). For example, in the context of a shooting game, the first user 104a may aim the first mobile device 102a at the second user 104b, who may be holding or wearing the second mobile device 102b and possibly aiming the second mobile device 102b at the first user 104a. As shown in FIG. 1B, crosshairs 110 may be displayed on the display 106 of the first mobile device 102a. The crosshairs 110 may help the first user 104a to position the first mobile device 102a so that the second mobile device 102b is located approximately within the center of the field of view of the camera of the first mobile device 102a. The first user 104a then provides some input (e.g., clicking a button on the first mobile device 102a) that causes the first mobile device 102a and the second mobile device 102b to remember (e.g., store in memory) and communicate certain information associated with that specific point in time.

In particular, the first mobile device 102a determines and remembers its position at time t1 when the second mobile device 102b is observed within the field of view of the camera of the first mobile device 102a. This position, which is represented in the first coordinate system used by the first mobile device 102a, will be referred to herein as $p1_{t1}$. (As used herein, the term $px_{ty}$ refers to the position of device x at time y.) The first mobile device 102a also communicates $p1_{t1}$ to the second mobile device 102b. It is assumed that the first mobile device 102a and the second mobile device 102b are substantially time synchronized.

The second mobile device 102b also determines and remembers its position at time t1. This position, which is represented in the second coordinate system used by the second mobile device 102b, will be referred to herein as $p2_{t1}$. The second mobile device 102b also communicates $p2_{t1}$ to the first mobile device 102a.

The first mobile device 102a also determines and remembers information about its orientation at time t1 with respect to the second mobile device 102b. For example, the first mobile device 102a may determine and remember a geometric line in space corresponding to the direction along which the second mobile device 102b was observed at time t1. This line will be referred to herein as $line_{t1}$. If the second mobile device 102b was observed in the center of the field of view of the camera of the first mobile device 102a at time t1, then this line in space would correspond to the optical axis of the camera.

This position information ($p1_{t1}$ and $p2_{t1}$) and orientation information ($line_{t1}$) may then be used to identify two constraints that relate the first coordinate system used by the first mobile device 102a to the second coordinate system used by the second mobile device 102b. In particular, the geometric constraint that the position of the second mobile device 102b at time t1 ($p2_{t1}$) should be located along the previously defined line in space ($line_{t1}$) provides two mathematical constraints to align the coordinate systems of both mobile devices 102a-b.

This process of observing another mobile device and using position and orientation information associated with that observation to determine two constraints may then be repeated at least two more times until at least six constraints are determined. However, it does not always have to be the same mobile device that does the observing each time (although it could be). For instance, in the depicted example, the second mobile device 102b observes the first mobile device 102a within the field of view of the camera of the second mobile device 102b at time t2.

More specifically, at time t2 the second user 104b positions the second mobile device 102b so that the first mobile device 102a is located within the field of view of the camera of the second mobile device 102b. The second user 104b then provides some input that causes the second mobile device 102b and the first mobile device 102a to remember and communicate certain information associated with time t2. In particular, the second mobile device 102b determines and remembers its position at time t2 ($p2_{t2}$), which is represented in the second coordinate system used by the second mobile device 102b. The second mobile device 102b also sends $p2_{t2}$ to the first mobile device 102a. In addition, the first mobile device 102a determines and remembers its position at time t2 ($p1_{t2}$), which is represented in the first coordinate system used by the first mobile device 102a. The first mobile device 102a also sends $p1_{t2}$ to the second mobile device 102b. The second mobile device 102b also determines and remembers information about its orientation at time t2 with respect to the first mobile device 102a. More precisely, the second mobile device 102b remembers the geometric line in space corresponding to the direction along which the first mobile device 102a was observed at time t2. This line will be referred to herein as $line_{t2}$.

This position and orientation information may then be used to identify two additional constraints that relate the second coordinate system used by the second mobile device 102b to the first coordinate system used by the first mobile device 102a. In particular, the geometric constraint that the position of the first mobile device 102a at time t2 ($p1_{t2}$) needs to be located along $line_{t2}$ provides an additional two mathematical constraints to align the coordinate systems of both mobile devices 102a-b.

Subsequently, at time t3 the first user 104a positions the first mobile device 102a so that the second mobile device 102b is located within the field of view of the camera of the first mobile device 102a. The first user 104a then provides some input that causes the first mobile device 102a and the second mobile device 102b to remember and communicate certain information associated with time t3. In particular, the first mobile device 102a determines and remembers its position at time t3 ($p1_{t3}$), which is represented in the first coordinate system used by the first mobile device 102a. The first mobile device 102a also sends $p1_{t3}$ to the second mobile device 102b. The second mobile device 102b determines and remembers its position at time t3 ($p2_{t3}$), which is represented in the second coordinate system used by the second mobile device 102b. The second mobile device 102b also sends $p2_{t3}$ to the first mobile device 102a. The first mobile device 102a also determines and remembers information about its orientation at time t3 with respect to the second mobile device 102b. More precisely, the first mobile device 102a remembers the geometric line in space corresponding to the direction along which the second mobile device 102b was observed at time t3. This line will be referred to herein as $line_{t3}$.

This position and orientation information may then be used to identify two additional constraints that relate the first coordinate system used by the first mobile device 102a to the second coordinate system used by the second mobile device 102b. In particular, the geometric constraint that the position of the second mobile device 102b at time t3 ($p2_{t3}$) needs to be located along $line_{t3}$ provides two additional mathematical constraints to align the coordinate systems of both mobile devices 102a-b.

In the present example, six constraints have been identified after time t3. This is a sufficient number of constraints to enable calculation of a six degrees of freedom transformation that relates the first coordinate system used by the first mobile device 102a to the second coordinate system used by the second mobile device 102b. As is known by those skilled in the art, the term "six degrees of freedom" (6 DoF) refers to the freedom of movement of a rigid body in three-dimensional space. In particular, a rigid body is free to change position as forward/backward (surge), up/down (heave), left/right (sway) translation in three perpendicular axes. Such translation may be combined with changes in orientation through rotation about three perpendicular axes, which are often termed yaw (normal axis), pitch (transverse axis), and roll (longitudinal axis). In the context of the present disclosure, a "six degrees of freedom transformation" (6 DoF transformation) specifies the mathematical operations that should be performed to convert position and orientation information that is represented in one coordinate system to equivalent position and orientation information that is represented in another coordinate system.

In the example just described, six constraints are obtained from three observation events. Two observation events occur at the first mobile device 102a (at times t1 and t3), and one observation event occurs at the second mobile device 102b (at time t2). The specific details of this particular example should not be interpreted as limiting the scope of the present disclosure. For instance, it is not necessary for the observation events to occur in any particular order. In an alternative example, the first mobile device 102a could have two consecutive observation events (e.g., at t1 and t2) before the second mobile device 102b has an observation event (e.g., at time t3). Also, it is not necessary for both mobile devices 102a-b to have observation events. In another alternative example, all three observation events may occur at the same mobile device.

In addition, more than three observation events may occur. As indicated above, a minimum of six constraints (from a minimum of three observation events) are needed in order to calculate a 6 DoF transformation that relates the first coordinate system used by the first mobile device 102a to the second coordinate system used by the second mobile device 102b. With minimal data (e.g., data from only three observation events), it is possible that more than one solution may be obtained in connection with calculating the 6 DoF transformation. With a redundant set of measurements, however, the solution typically becomes unique.

In some embodiments, both of the mobile devices 102a-b may calculate the 6 DoF transformation. In the particular example that was just described, four constraints are determined based on observations made by the first mobile device 102a (at times t1 and t3), and two constraints are determined based on observations made by the second mobile device 102b (at time t2). The mobile devices 102a-b may share information about these constraints with one another so that both mobile devices 102a-b have sufficient information to calculate the 6 DoF transformation. Alternatively, one of the mobile devices (e.g., the first mobile device 102a) may calculate the 6 DoF transformation and share the 6 DoF transformation with the other mobile device (e.g., the second mobile device 102b). Alternatively still, another entity that is distinct from the mobile devices 102a-b may calculate the 6 DoF transformation and share the 6 DoF transformation with the mobile devices 102a-b. This other entity may be a server that is in electronic communication with the mobile devices 102a-b via one or more computer networks. In some embodiments, this other entity may be a cloud-based entity.

The constraints that are determined as a result of observation events may be combined with additional constraints that are known independently of observation events for purposes of calculating the 6 DoF transformation. For instance, with respect to the example shown in FIGS. 1A-C, the six constraints that are determined as a result of the three observation events (at times t1, t2, and t3) may be combined with additional constraints such as a known common vertical orientation (two constraints), a height above ground (one constraint), a dominant wall orientation (one constraint), and so forth. A common vertical orientation may be determined from inertial measurements or vertical vanishing points/lines. The height above ground may be determined when a ground plane is observed. The orientation with respect to a room may be determined when walls are observed. A redundant set of constraints can be used to obtain more accurate and/or robust results.

In the example shown in FIGS. 1A-C, user input triggers the observation events. In other words, user input causes the mobile devices 102a-b to remember and communicate certain information associated with specific points in time, and to use this information to determine constraints for relating the coordinate systems of the mobile devices 102a-b. This user input may be provided when a user sees another mobile device in the field of view of the camera of the user's mobile device (as seen, for example, on a display 106).

In some embodiments, having user input trigger the observation events can be integrated into the user experience as part of game play. This may be applicable to some mixed-reality experiences, such as a game where users are supposed to shoot at each other. In this type of scenario, when the user shoots, one can in general assume that he or she is aiming at the other user. After players have shot a few times at each other, the disclosed techniques can be used to determine the relative pose between the coordinate systems of both mobile devices. This information can then be used to enrich the users' experience.

Integrating the observation events into the user experience as part of game play may provide certain benefits relative to at least some known approaches. As indicated above, the typical solution to register the coordinate system for multiple devices is to exchange three-dimensional map information (or two-dimensional image data) between devices. With at least some known approaches, user input may be required to exchange such information/data. Moreover, the required user input may be in addition to whatever user input would otherwise occur naturally as part of the user experience (e.g., something more than shooting as part of game play). Integrating the observation events into the user experience as part of game play, as disclosed herein, eliminates the need for this extra user input, thereby making the overall experience more natural and more enjoyable for the user.

Notwithstanding the foregoing, however, it is not necessary for user input to be integrated into the user experience. In fact, it is not necessary to rely on user input to trigger observation events. Alternatively, instead of relying on such user input, a mobile device may be configured to automatically detect the presence of another mobile device in the field of view of its camera, and to automatically remember and communicate the relevant position and orientation information in response to detecting another mobile device in this way. In other words, in some embodiments, observation events may be triggered when one mobile device automatically detects another mobile device in its camera's field of view.

A mobile device may use an object recognition algorithm to detect the presence of another mobile device within its camera's field of view. This procedure can be simplified when the mobile device being detected is equipped with a light emitter that can be observed by the mobile device that is making the observation. For example, referring again to the example shown in FIGS. 1A-C, suppose that the second mobile device 102b is equipped with a light emitter and that the light emitter is activated at time t1. Instead of relying on input from the first user 104a to trigger the observation event, the first mobile device 102a may instead automatically detect the second mobile device 102b within its camera's field of view. The activated light emitter on the second mobile device 102b may help to facilitate this automatic detection. Some examples of light emitters that may be used in connection with the techniques disclosed herein include a flashlight on a mobile phone, a privacy light associated with a camera, and an infrared emitter that is used by some three-dimensional cameras on some head-mounted displays (e.g., in mixed-reality headsets). An infrared emitter may be observed by an infrared/depth camera of a similarly equipped device.

In some embodiments, the identity of a particular mobile device may be communicated via a unique pattern emitted by the light emitter on that mobile device. In other words, a mobile device may turn its light emitter on and off in accordance with a particular pattern, and the pattern used by a particular mobile device may be unique (at least with respect to a set of mobile devices that are being used at the same time in the same place). Another mobile device that is observing the pattern may be able to determine the identity of the light-emitting mobile device based on the unique pattern that is emitted.

Although the example shown in FIGS. 1A-C included two mobile devices 102a-b, under some circumstances it may be desirable to determine the relative pose between more than two mobile devices. The techniques disclosed herein can also be extended to more than two mobile devices, as long as each mobile device has sufficient constraints with respect to the other mobile devices to allow for relative localization.

When more than two mobile devices are involved, there is an additional difficulty because the field of view of a particular mobile device may include more than one mobile device. When a mobile device is attempting to determine its pose with respect to a particular mobile device and there are a plurality of mobile devices visible within the field of view of its camera, it may be difficult to determine which of the plurality of mobile devices is the particular mobile device that is the subject of the pose calculations.

Figure 2:
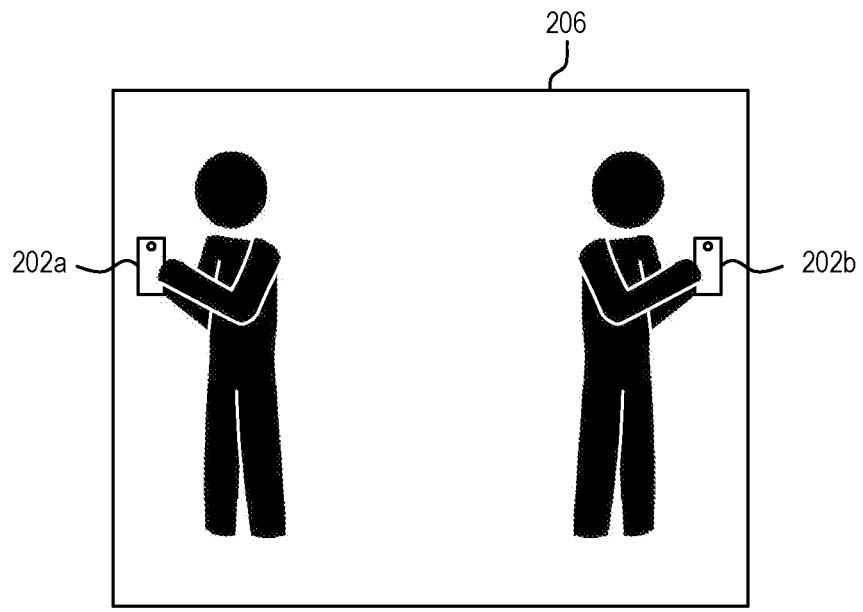
FIG. 2 illustrates a field of view of a mobile device at a point in time when a plurality of other mobile devices are visible within the field of view.

FIG. 2 illustrates a field of view of a mobile device as seen, for example, on a display 206. A plurality of other mobile devices 202a-b are visible in the field of view. The mobile device whose field of view is shown in FIG. 2 will be referred to as the observing mobile device, and the mobile devices 202a-b that are visible within the field of view of the observing mobile device will be referred to as a first observed mobile device 202a and a second observed mobile device 202b.

Suppose that the observing mobile device is attempting to calculate its pose with respect to the first observed mobile device 202a. It may be difficult for the observing mobile device to determine which of the mobile devices 202a-b that are visible in its camera's field of view is the first observed mobile device 202a. In other words, it may be difficult for the observing mobile device to distinguish between the first observed mobile device 202a and the second observed mobile device 202b. Therefore, when an observation event is triggered (e.g., in response to user input or, alternatively, when the observing mobile device automatically detects the mobile devices 202a-b), it may be difficult for the observing mobile device to decide whether it should determine and remember information about its orientation with respect to the first observed mobile device 202a or the second observed mobile device 202b.

This problem can be addressed in several different ways. In some embodiments, robust algorithms such as random sample consensus (RANSAC) may be used. RANSAC is an outlier detection method, and correspondences to other mobile devices may be considered as outliers. This may be particularly effective where a relatively small number of mobile devices are visible in the camera's field of view at any given time.

As another example, in some embodiments it may be possible to use image recognition algorithms to associate observation events that correspond to the same device. For instance, referring again to the example shown in FIG. 2, suppose that the observing mobile device detects the first observed mobile device 202a by itself at a previous point in time (i.e., prior to observing the two mobile devices 202a-b at the same time as shown in FIG. 2). The observing mobile device may store an image of the first observed mobile device 202a in response to making that observation. Subsequently, when the observing mobile device observes both the first observed mobile device 202a and the second observed mobile device 202b at the same time (as shown in FIG. 2), the previously stored image may be used to detect the first observed mobile device 202a and distinguish it from the second observed mobile device 202b.

Once two mobile devices' coordinate systems are aligned with respect to each other, they can be considered to be a single mobile device for the purpose of the techniques disclosed herein for obtaining a relative localization between a plurality of mobile devices. This would, in turn, facilitate aligning one or more additional mobile devices to both previously aligned mobile devices.

Figure 3:
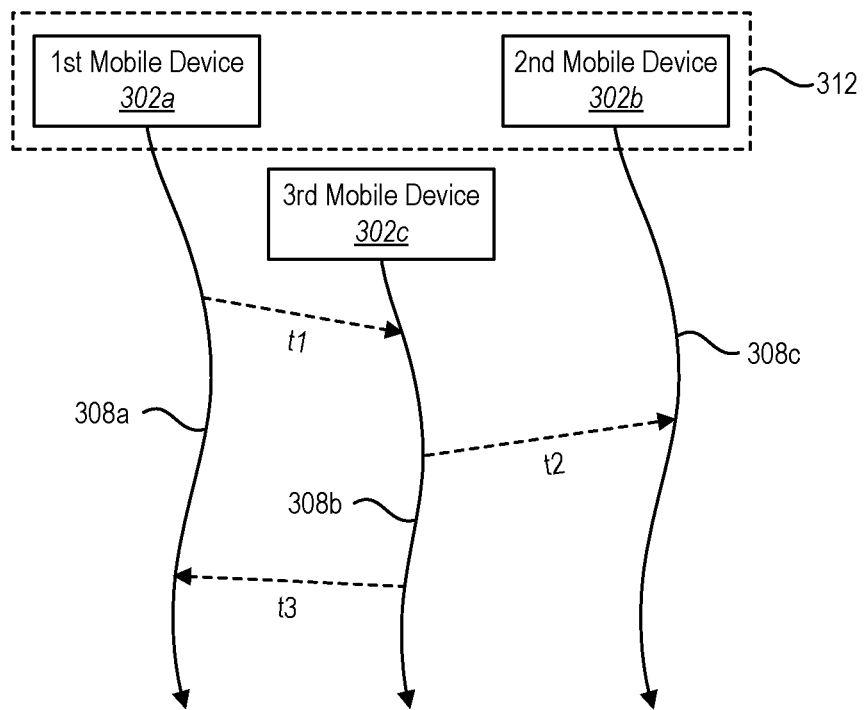
FIG. 3 illustrates an example in which two mobile devices' coordinate systems are aligned with respect to each other and are considered to be a single mobile device for the purpose of the localization techniques disclosed herein.

An example of this feature is shown in FIG. 3. Suppose that a first mobile device 302a and a second mobile device 302b align their coordinate systems with one another in accordance with the techniques disclosed herein. The first mobile device 302a and the second mobile device 302b may then be considered to be a "single" mobile device 312 for purposes of aligning their shared coordinate system with another mobile device. Thus, a third mobile device 302c may subsequently align itself with the coordinate system used by this "single" mobile device 312 (i.e., used by both the first mobile device 302a and the second mobile device 302b).

As discussed above, the coordinate systems of two mobile devices may be aligned with one another after a minimum of three observation events (each observation event producing two of the six constraints that are needed to compute a 6 DoF transformation). In the present example, however, these observation events may occur as a result of interactions between the third mobile device 302c and the first mobile device 302a and/or as a result of interactions between the third mobile device 302c and the second mobile device 302b.

FIG. 3 illustrates the trajectory 308a of the first mobile device 302a, the trajectory 308b of the second mobile device 302b, and the trajectory 308c of the third mobile device 302c as the users of these devices move around over a period of time. Suppose that a first observation event occurs at time t1 in which the third mobile device 302c observes the first mobile device 302a and both devices 302a, 302c determine and remember the corresponding position and orientation information to determine two constraints for calculating the relative pose between these devices 302a, 302c (in the manner described above). Then, a second observation event occurs at time t2 in which the second mobile device 302b observes the third mobile device 302c and both devices 302b, 302c determine and remember the corresponding position and orientation information for determining two additional constraints. Subsequently, a third observation event occurs at time t3 in which the first mobile device 302a observes the third mobile device 302c and both devices 302a, 302c determine and remember the corresponding position and orientation information for determining two additional constraints. This would produce enough constraints to compute the 6 DoF transformation for aligning the respective coordinate systems because the first mobile device 302a and the second mobile device 302b are considered to be a "single" mobile device 312 for purposes of aligning their shared coordinate system with the third mobile device 302c.

As indicated above, the typical solution to register the coordinate system for a plurality of mobile devices is to exchange three-dimensional map information between the mobile devices. This three-dimensional map information is typically determined in accordance with a simultaneous localization and mapping (SLAM) algorithm. A 3D map that is created using a SLAM algorithm may be referred to herein as a SLAM map. In accordance with the present disclosure, once the coordinate systems of two or more mobile devices are aligned as described herein, the SLAM maps that are being constructed by each mobile device can be merged into a larger, more complete SLAM map.

Figure 4:
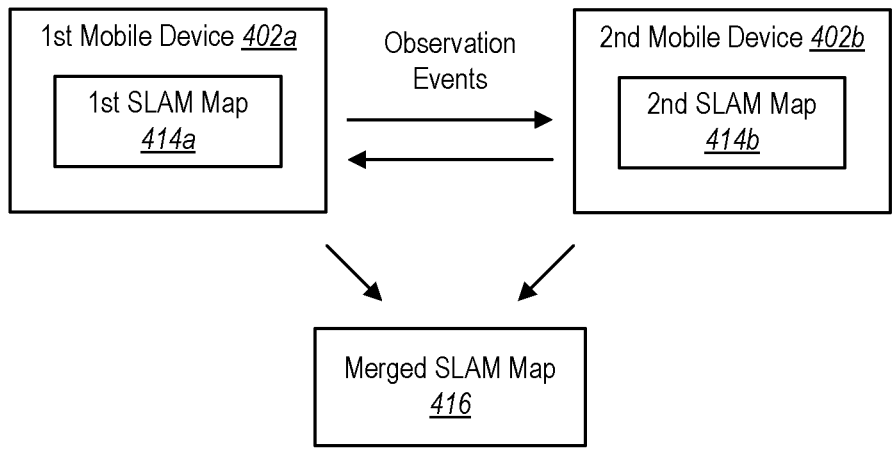
FIG. 4 illustrates an example in which two mobile devices' simultaneous localization and mapping (SLAM) maps are merged after the mobile devices' coordinate systems are aligned with respect to each other.

FIG. 4 illustrates a first mobile device 402a that creates a first SLAM map 414a and a second mobile device 402b that creates a second SLAM map 414b. If the first mobile device 402a and the second mobile device 402b align their coordinate systems with one another based on observation events in accordance with the techniques disclosed herein, then the first SLAM map 414a and the second SLAM map 414b may be merged into a larger, more complete SLAM map, which is illustrated in FIG. 4 as a merged SLAM map 416. The merged SLAM map 416 may include information from both the first SLAM map 414a and the second SLAM map 414b. The merged SLAM map 416 may be used by both the first mobile device 402a and the second mobile device 402b.

Being able to merge SLAM maps in this way may enable easier localization of additional mobile devices. In addition, it may enable persistence (sharing coordinate systems across time) based on more complete maps of the surrounding environment. In other words, the techniques disclosed herein may also improve traditional 3D map-based sharing and persistence approaches. The disclosed techniques may provide particular benefits in connection with merging SLAM maps that have no direct visual overlap that would allow for traditional image based alignment. For example, suppose that the first SLAM map 414a and the second SLAM map 414b are generated from opposing viewpoints. This may be the case, for instance, if the first mobile device 402a and the second mobile device 402b are positioned opposite each other (e.g., across the table from one another) such that there is no overlap between the field of view of the camera of the first mobile device 402a and the field of view of the camera of the second mobile device 402b. In this example, the merged SLAM map 416 would include map information about a much larger area than either the first SLAM map 414a or the second SLAM map 414b individually.

Figure 5:
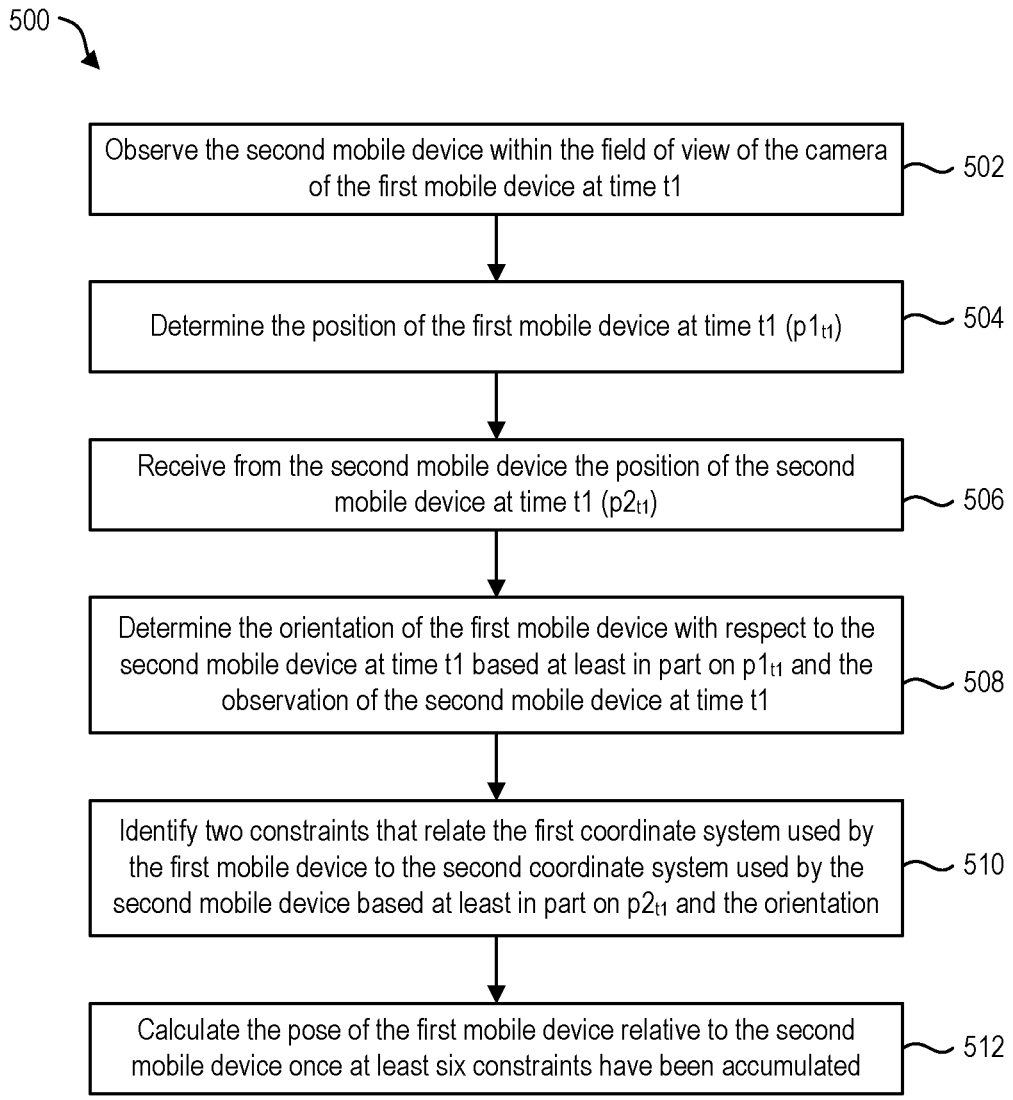
FIG. 5 illustrates a method for obtaining a relative localization between a plurality of mobile devices in accordance with the present disclosure.

FIG. 5 illustrates a method 500 for obtaining a relative localization between a plurality of mobile devices in accordance with the present disclosure. For the sake of clarity, the method 500 will be described in relation to some of the systems, devices, components, and data described previously. The method 500 will be described from the perspective of a first mobile device 102a that is interacting with a second mobile device 102b. As before, the user of the first mobile device 102a will be referred to as the first user 104a, and the user of the second mobile device 102b will be referred to as the second user 104b.

In step 502, the first mobile device 102a observes the second mobile device 102b within a field of view of the camera of the first mobile device 102a at a first point in time (t1). This may occur as a result of the first user 104a aiming the first mobile device 102a at the second user 104b. The second user 104b may be holding or wearing the second mobile device 102b. The second user 104b may be aiming the second mobile device 102b at the first user 104a.

In step 504, the first mobile device 102a determines the position of the first mobile device 102a at time t1 ($p1_{t1}$). The value of $p1_{t1}$ is represented in a first coordinate system that is used by the first mobile device 102a.

In step 506, the first mobile device 102a receives from the second mobile device 102b the position of the second mobile device 102b at time t1 ($p2_{t1}$). The value of $p2_{t1}$ is represented in a second coordinate system that is used by the second mobile device 102b.

In step 508, the first mobile device 102a determines information about the orientation of the first mobile device 102a with respect to the second mobile device 102b at time t1 based at least in part on the first position (phi) and the observation of the second mobile device 102b at time t1. For example, the first mobile device 102a may determine and remember a geometric line in space ($line_{t1}$) corresponding to the direction along which the second mobile device 102b was observed at time t1.

In step 510, the first mobile device 102a identifies two constraints that relate the first coordinate system used by the first mobile device 102a to the second coordinate system used by the second mobile device 102b based at least in part on the second position ($p2_{t1}$) and the orientation information (as represented, for example, by $line_{t1}$). For example, the geometric constraint that the position of the second mobile device 102b at time t1 ($p2_{t1}$) should be located along the previously defined line in space ($line_{t1}$) provides two mathematical constraints to align the first coordinate system used by the first mobile device 102a with the second coordinate system used by the second mobile device 102b.

Steps 502 through 510 of the method 500 correspond to a single observation event. In some embodiments, an observation event like the one represented by steps 502 through 510 may be triggered by user input. More specifically, when in step 502 the first mobile device 102a observes the second mobile device 102b within its camera's field of view at time t1, the first user 104a may provide some type of user input (e.g., clicking a button on the first mobile device 102a). Steps 504 through 510 may be performed in response to receiving this user input.

In some embodiments, the method 500 may be performed during a game that involves the first mobile device 102a and the second mobile device 102b. The user input that causes steps 504 through 510 to be performed may be provided as part of the game. For example, the game may be a shooting game in which the users 104a-b are supposed to shoot at each other using the mobile devices 102a-b. Step 502 of the method 500, in which the first mobile device 102a observes the second mobile device 102b within its camera's field of view, may occur as a result of the first user 104a aiming the first mobile device 102a at the second user 104b, who may be holding or wearing the second mobile device 102b. The user input that causes steps 504 through 510 to occur may be provided when the first user 104a takes some action (e.g., activating a trigger button on the first mobile device 102a) that causes the first mobile device 102a to shoot at the second user 104b as part of the game.

Alternatively, an observation event like the one represented by steps 502 through 510 may be triggered by when one mobile device automatically detects another mobile device in its camera's field of view. More specifically, when in step 502 the first mobile device 102a observes the second mobile device 102b within its camera's field of view at time t1, the first mobile device 102a may automatically detect the second mobile device 102b (e.g., via an object recognition algorithm). Steps 504 through 510 of the method 500 may be performed in response to the first mobile device 102a automatically detecting the second mobile device 102b. In other words, the first mobile device 102a may perform steps 504 through 510 of the method 500 in response to the first mobile device 102a detecting the second mobile device 102b, without the need for any additional user input. In some embodiments, the second mobile device 102b may include a light emitter. If this light emitter is activated when the first mobile device 102a observes the second mobile device 102b within its camera's field of view at time t1, then this activated light emitter may make it easier for the first mobile device 102a to automatically detect the second mobile device 102b.

In step 502, when the first mobile device 102a observes the second mobile device 102b within its camera's field of view, there may be one or more additional mobile devices that are also visible within the field of view. (For example, as shown in FIG. 2, a plurality of mobile devices 202a-b may be visible in a camera's field of view at the same time.) Thus, in some embodiments, the method 500 may additionally involve distinguishing between the second mobile device 102b and one or more additional mobile devices that are also visible within the camera's field of view. This may be accomplished in various ways, such as through the use of an image recognition algorithm or a random sample consensus (RANSAC) algorithm, as discussed above.

The observation event represented by steps 502 through 510 provides two constraints that relate the first coordinate system used by the first mobile device 102a to the second coordinate system used by the second mobile device 102b. Once at least six constraints have been accumulated, then in step 512 the first mobile device 102a may calculate the pose of the first mobile device 102a relative to the second mobile device 102b. For example, the first mobile device 102a may use the six (or more) constraints to calculate a 6 DoF transformation that relates the first coordinate system used by the first mobile device 102a to the second coordinate system used by the second mobile device 102b.

In some embodiments, the six (or more) constraints that are used to calculate the pose in step 512 may include (a) a plurality of constraints that are determined as a result of observation events, and (b) one or more additional constraints that are known independently of observation events. Some examples of these additional constraints include a known common vertical orientation, a height above ground, a dominant wall orientation, and so forth. These additional constraints can be used to obtain more accurate and/or robust results.

Figure 6:
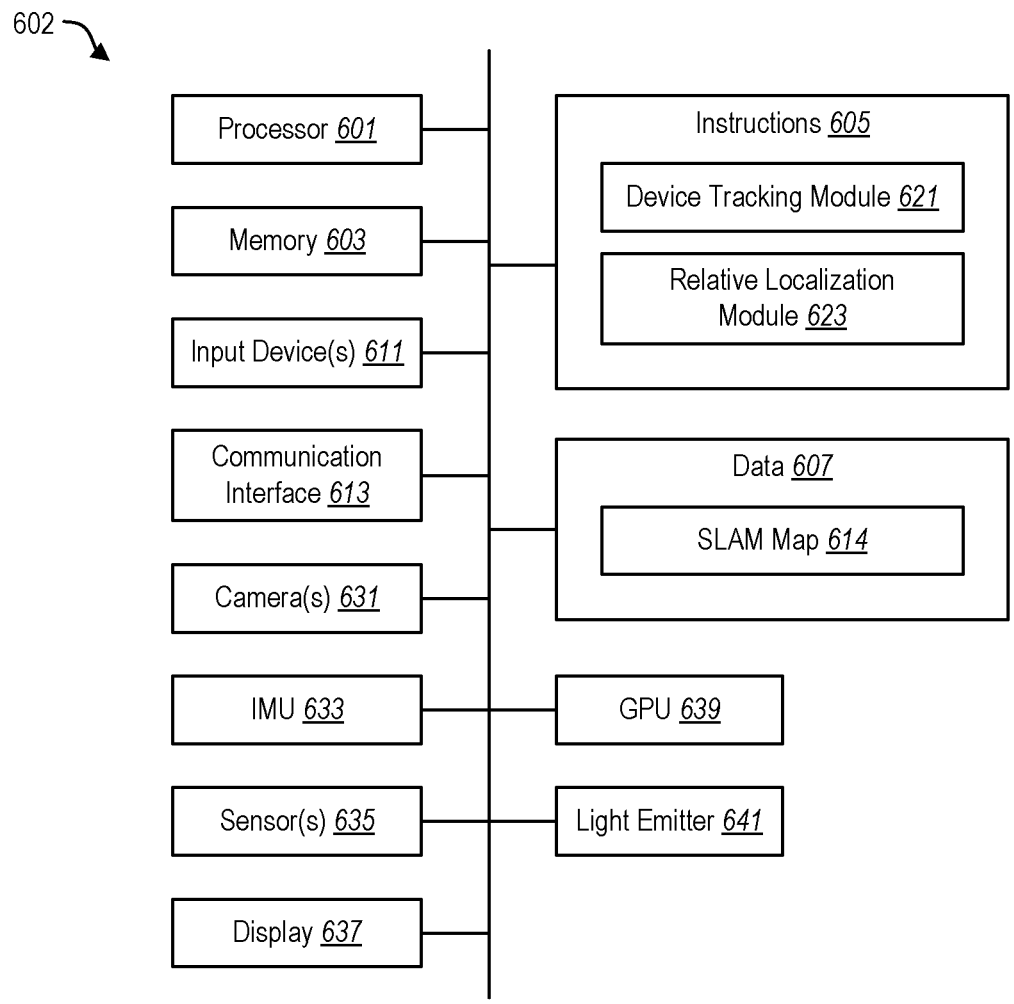
FIG. 6 illustrates certain components that may be included within a mobile device that is configured to implement the techniques disclosed herein.

FIG. 6 illustrates certain components that may be included within a mobile device 602 that is configured to implement the techniques disclosed herein. The mobile device 602 shown in FIG. 6 represents one possible implementation of the mobile devices 102a-b, 202a-b, 302a-c, 402a-b that were described previously.

The mobile device 602 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the mobile device 602 of FIG. 6, in an alternative configuration, a combination of processors (e.g., an ARM and DSP) could be used.

The mobile device 602 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor 601, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the steps, operations, actions, or other functionality disclosed herein. Executing the instructions 605 may involve the use of the data 607 that is stored in the memory 603. Unless otherwise specified, any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

The instructions 605 may include a device tracking module 621. The device tracking module 621 may be configured to track the position and the motion of the mobile device 602 in space. The mobile device 602 may include various components that facilitate such tracking, including one or more cameras 631, an inertial measurement unit (IMU) 633, and one or more other sensors 635. The device tracking module 621 may perform optical based tracking based on input received from the camera(s) 631. In some embodiments, the device tracking module 621 may also utilize input received from the IMU 633 and the sensor(s) 635 to enhance tracking. The tracking can comprise, for example, six degrees of freedom (6 DoF) device tracking. This can be implemented using simultaneous localization and mapping (SLAM) and/or visual-inertial odometry (VIO). The device tracking module 621 may be configured to construct and/or update a SLAM map 614 of an unknown environment while simultaneously keeping track of the location of the mobile device 602 within the environment.

The instructions 605 may also include a relative localization module 623. The relative localization module 623 may be configured to determine the relative localization between the mobile device 602 and one or more other mobile devices in accordance with the techniques disclosed herein. For example, the relative localization module 623 may be configured to implement methods such as the method 500 shown in FIG. 5.

The mobile device 602 may include a display 637. In some embodiments (e.g., in embodiments where the mobile device 602 is a mixed-reality device), the display 637 may include one or more semitransparent lenses on which images of virtual objects may be displayed. Different stereoscopic images may be displayed on the lenses to create an appearance of depth, while the semitransparent nature of the lenses allows the user to see both the real world as well as the virtual objects rendered on the lenses. The mobile device 602 may also include a graphics processing unit (GPU) 639. The processor(s) 601 may direct the GPU 639 to render the virtual objects and cause the virtual objects to appear on the display 637.

The mobile device 602 may also include a light emitter 641. The light emitter 641 may be activated in order to make it easier for the mobile device 602 to be detected by another mobile device. In some embodiments (e.g., if the mobile device 602 is a mobile phone), the light emitter 641 may be a flashlight or a privacy light. Alternatively, the light emitter 641 may be an infrared emitter that is used by some three-dimensional cameras on some head-mounted displays (e.g., in mixed-reality headsets). In some embodiments, one or more of the cameras 631 of the mobile device 602 may be an infrared/depth camera that is configured to detect infrared light emitted by another mobile device.

The mobile device 602 may also include one or more input devices 611. The input device(s) 611 may be used to provide user input for triggering observation events. In some embodiments, the input device(s) 611 may include one or more buttons. Some other examples of input devices 711 include a keyboard, mouse, microphone, remote control device, button, joystick, trackball, touchpad, and lightpen.

The mobile device 602 may also include one or more communication interfaces 613 for communicating with other electronic devices, such as other mobile devices. For example, the mobile device 602 may use a communication interface 613 to send position information and/or orientation information to another mobile device in connection with determining its pose with respect to the other mobile device. The communication interface(s) 613 may be based on wired communication technology, wireless communication technology, or both. Some examples of communication interfaces 613 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method implemented by a first mobile device, comprising:
    detecting a second mobile device within a field of view of a camera of the first mobile device at a plurality of different points in time;
    determining first position information based on the detecting, the first position information indicating a position of the first mobile device and a position of the second mobile device at the plurality of different points in time in a first coordinate system used by the first mobile device;
obtaining second position information indicating the position of the second mobile device at the plurality of different points in time in a second coordinate system used by the second mobile device; and
calculating a pose of the first mobile device relative to the second mobile device based at least in part on the first position information and the second position information.

2. The method of claim 1, wherein the pose is calculated without the first mobile device and the second mobile device exchanging three-dimensional map information.

3. The method of claim 1, further comprising:
receiving user input when the second mobile device is observed within the field of view of the camera of the first mobile device at a first point in time;
determining, in response to the user input, the position of the first mobile device and the position of the second mobile device in the first coordinate system at the first point in time; and
obtaining, in response to the user input, the position of the second mobile device in the second coordinate system at the first point in time.

4. The method of claim 3, wherein:
the method is performed during a game that involves the first mobile device and the second mobile device; and
the user input is provided as part of the game.

5. The method of claim 1, wherein calculating the pose comprises calculating a six degrees of freedom transformation that relates the first coordinate system used by the first mobile device to the second coordinate system used by the second mobile device.

6. The method of claim 1, wherein calculating the pose comprises:
determining orientation information indicating an orientation of the first mobile device with respect to the second mobile device at the plurality of different points in time based at least in part on the first position information; and
identifying at least six constraints that relate the first coordinate system used by the first mobile device to the second coordinate system used by the second mobile device based at least in part on the orientation information.

7. The method of claim 6, wherein:
determining the orientation information for a first point in time comprises determining a geometric line in space corresponding to a direction along which the second mobile device was observed at the first point in time; and
calculating the pose further comprises using the orientation for the first point in time to identify two constraints that relate the first coordinate system to the second coordinate system.

8. The method of claim 1, wherein detecting the second mobile device comprises detecting an activated light emitter of the second mobile device.

9. The method of claim 1, wherein:
the second mobile device and at least one additional mobile device are both visible within the field of view of the camera of the first mobile device during at least one of the plurality of different points in time; and
the method further comprises distinguishing between the second mobile device and the at least one additional mobile device.

10. The method of claim 1, further comprising:
creating a first simultaneous localization and mapping (SLAM) map based on the field of view of the camera of the first mobile device; and
merging the first SLAM map with a second SLAM map that is created by the second mobile device.

11. A first mobile device, comprising:
a camera configured to observe a second mobile device within a field of view of the camera at a plurality of different points in time;
one or more processors;
memory in electronic communication with the one or more processors; and
instructions stored in the memory, the instructions being executable by the one or more processors to calculate a pose of the first mobile device relative to the second mobile device based at least in part on observations of the second mobile device made by the camera and position information obtained from the second mobile device, the position information indicating a position of the second mobile device at the plurality of different points in time in a coordinate system used by the second mobile device.

12. The first mobile device of claim 11, further comprising:
a user input device;
additional instructions stored in the memory, the additional instructions being executable by the one or more processors to:
receive user input when the second mobile device is observed within the field of view of the camera of the first mobile device at a first point in time;
determine, in response to the user input, a position of the first mobile device and the position of the second mobile device in a coordinate system used by the first mobile device at the first point in time; and
obtain, in response to the user input, the position of the second mobile device in the coordinate system used by the second mobile device at the first point in time.

13. The first mobile device of claim 11, wherein the instructions executable to calculate the pose comprise instructions executable to calculate a six degrees of freedom transformation that relates a coordinate system used by the first mobile device to the coordinate system used by the second mobile device.

14. The first mobile device of claim 11, further comprising additional instructions stored in the memory, the additional instructions being executable by the one or more processors to:
determine orientation information indicating an orientation of the first mobile device with respect to the second mobile device at the plurality of different points in time based at least in part on the observations of the second mobile device made by the camera; and
identify constraints that relate a coordinate system used by the first mobile device to the coordinate system used by the second mobile device based at least in part on the orientation information.

15. The first mobile device of claim 11, wherein:
the second mobile device and at least one additional mobile device are both visible within the field of view of the camera of the first mobile device during at least one of the plurality of different points in time; and
the first mobile device further comprises additional instructions stored in the memory, the additional instructions being executable by the one or more processors to distinguish between the second mobile device and the at least one additional mobile device.

16. The first mobile device of claim 11, further comprising additional instructions stored in the memory, the additional instructions being executable by the one or more processors to:
   create a first simultaneous localization and mapping (SLAM) map based on the field of view of the camera of the first mobile device; and
   merge the first SLAM map with a second SLAM map that is created by the second mobile device.

17. A computer-readable medium comprising instructions that are executable by one or more processors to:
   obtain first position information based on observations by a first mobile device of a second mobile device at a plurality of different points in time, the first position information indicating a position of the first mobile device and a position of the second mobile device at the plurality of different points in time in a first coordinate system used by the first mobile device;
   obtain second position information indicating a position of the second mobile device at the plurality of different points in time in a second coordinate system used by the second mobile device; and
   calculate a pose of the first mobile device relative to the second mobile device based at least in part on the first position information and the second position information, wherein the pose is calculated without the first mobile device and the second mobile device exchanging three-dimensional map information.

18. The computer-readable medium of claim 17, wherein the instructions executable to calculate the pose comprise instructions executable to calculate a six degrees of freedom transformation that relates the first coordinate system used by the first mobile device to the second coordinate system used by the second mobile device.

19. The computer-readable medium of claim 17, further comprising additional instructions stored in memory, the additional instructions being executable by the one or more processors to:
   determine orientation information indicating an orientation of the first mobile device with respect to the second mobile device at the plurality of different points in time based at least in part on the first position information; and
   identify constraints that relate the first coordinate system used by the first mobile device to the second coordinate system used by the second mobile device based at least in part on the orientation information.

20. The computer-readable medium of claim 17, further comprising additional instructions stored in memory, the additional instructions being executable by the one or more processors to:
   create a first simultaneous localization and mapping (SLAM) map based on a field of view of a camera of the first mobile device; and
   merge the first SLAM map with a second SLAM map that is created by the second mobile device.

* * * * *